Oct. 10, 1972   M. KUTS   3,697,356
MANUFACTURE OF WINDSHIELD WIPER BLADES
Filed April 19, 1971
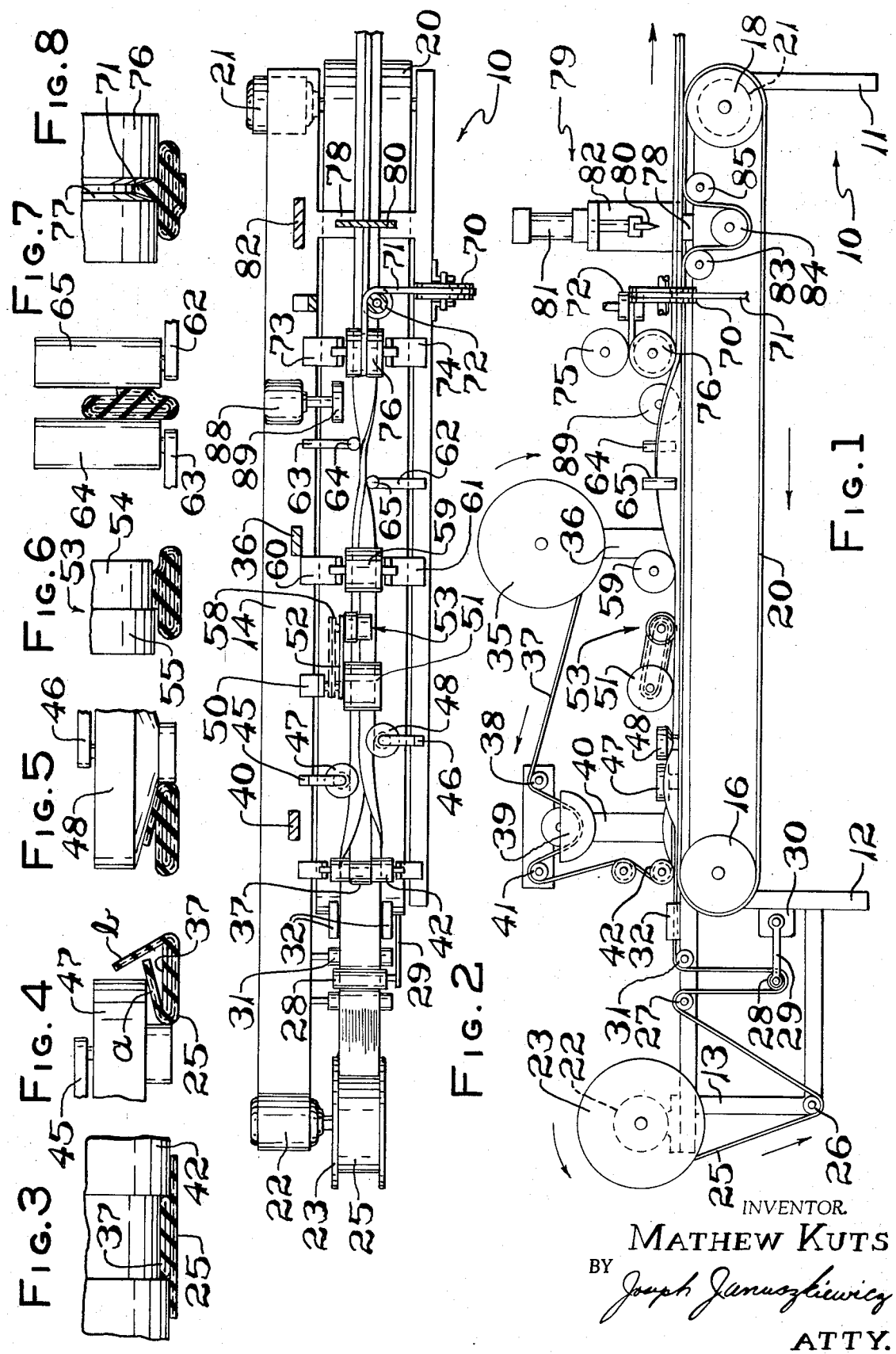
INVENTOR.
MATHEW KUTS
BY Joseph Januszkiewicz
ATTY.

United States Patent Office 3,697,356
Patented Oct. 10, 1972

1

3,697,356
MANUFACTURE OF WINDSHIELD
WIPER BLADES
Mathew Kuts, Akron, Ohio, assignor to The B. F.
Goodrich Company, New York, N.Y.
Filed Apr. 19, 1971, Ser. No. 135,092
Int. Cl. B32b 3/04
U.S. Cl. 156—467                                  8 Claims

ABSTRACT OF THE DISCLOSURE

An apparatus for making a distendable stationary window wiper blade which is suitable for cleaning a movable window as in station wagons. The blade is distendable by fluid pressure to simultaneously press the wiper blade against the window and spray liquid against the window to provide means for lubricating and wetting the window. Such wiper blade is made by encasing a tube with fabric reinforced material and setting a bead centrally along the central length thereof.

BACKGROUND OF THE INVENTION

This invention relates to an apparatus and method for making distendable blades which blades are distendable upon actuation and simultaneously dispense fluids against a movable window to facilitate the cleaning thereof. This type of wiper blade is particularly useful for cleaning power operated windows in a motor vehicle such as the remotely operated rear window of a station wagon.

Prior to this invention wiper blade assemblies have consisted primarily of a wiper blade supported by mechanical spring mechanisms which bias the wiper blade against the associated window. The spring mechanisms have been leaf springs essentially similar to the form of supports commonly used on power operated oscillating wipers for automobile windshields.

Such prior art wiper blade assemblies are not adaptable as a practical matter for use on the rear windows of station wagons due to the problem of remoteness of power, complex controls and the fact that wiping area of the oscillating wiper blade is unsatisfactory because its pattern of cleaning is a sector of a circle and not acceptable when such wiper blades are used on large rectangular shaped windows as in the large rear window of a station wagon.

SUMMARY OF THE INVENTION

The wiper blade of this invention provides for the selective engagement and disengagement of a wiper bead from an adjacently located window through the use of a simple fluid pressure system. Preferably, liquid pressure is used to position the wiper blade so that as the blade is positioned, the fluid medium is dispensed against the window that is to be cleaned. Such spraying liquid medium on the window is done simultaneously with the engagement of the wiper bead with the window. That is the washing and the wiping function are provided in a single integral assembly. The present invention provides the novel means and apparatus for making such wiper blade. Heretofore, the fabrication of such blades were a hand operation confined to manipulating the various elastomeric stock by hand.

The apparatus and method of this invention provides for a simplified means for constructing a unitary wiper blade in an economical manner which eliminates hand operations.

DESCRIPTION OF THE DRAWINGS

FIG. 1 is a schematic side elevational view of the apparatus for fabricating a window wiper blade.

2

FIG. 2 is a schematic plan view of the apparatus for fabricating a window wiper blade.

FIG. 3 is a fragmentary cross sectional view of a tube and rubberized fabric being pressed into position.

FIG. 4 is a fragmentary cross sectional view of the rubberized fabric having its one edge folded onto the tube by roller means.

FIG. 5 is a fragmentary cross sectional view of the rubberized fabric having its second edge folded onto the tube.

FIG. 6 is a fragmentary cross sectional view of the rubberized fabric being firmly pressed into engagement.

FIG. 7 is a fragmentary cross sectional view of the fabricated wiper blade being turned over.

FIG. 8 is a fragmentary cross sectional view of the fabricated wiper blade having a bead pressed into engagement with the body portion of the wiper blade.

Referring to the drawings wherein like reference characters designate like or corresponding parts throughout the several views, there is shown in FIG. 1 a supporting structure or support means designated generally by the reference character 10. Support means 10 includes a plurality of vertical supports 11, 12 and 13 with suitable cross braces including horizontally extending support 14 (FIG. 2). Mounted on support means 10 are a pair of spaced pulleys 16 and 18 upon which is trained an endless belt 20 to present an upper conveying run and a lower return run. The conveying run of endless belt 20 adjacent to pulley 16 is the receiving end while the conveying run of belt 20 adjacent to pulley 18 is the discharge end. Pulley 18 is driven by a motor drive unit 21 mounted on horizontally extending support 14. Suitably mounted on the other end of support 14 is a motor drive unit 22 which drives a supply means or reel 23. Reel 23 has a supply of fabric reinforced elastomeric material or tape 25 wound thereon. Energization of motor drive unit 22 unwinds the tape 25 for passage under idler roller 26 and over roller 27 for passage under a dancer roller 28. A separate roll not shown may be used to wind up the liner that is used with tape 25 to prevent it from sticking to the other portions of the tape on reel 23. Dancer 28 is guided for vertical movement in suitable guide means not shown such that the position of a lever arm 29 connected to dancer roll 28 is operative to control the energization and de-energization of motor 22. One end of a lever 29 is operative to actuate a plurality of limit switches in housing 30 to control such motor 22. The operation of motor 22 controls the rotation of reel 23 in such a manner that it maintains a suitable supply of tape 25 in an untensioned condition for passage onto the receiving end of endless belt 20. Tape 25 upon movement from dance roll 28 is directed upwardly over idler roll 31 and thence through a pair of spaced guides 32, for movement onto conveyor 20. A supply means or supply reel 35 is suitably mounted on a bracket 36 which reel 35 supplies an elastomeric tube 37 which passes over idler roller 38 for passage onto a tank 39 mounted on a T-shaped support 40. Tank 39 contains a cement solution which coats the exterior of the tube 37 as it passes therethrough. T-shaped support 40 contains a second idler roller 41 which directs the passage of tube 37 over idler roller 38, thence into tank 39 for subsequent movement over idler roller 41 and thence in a direction downwardly towards a grooved roller 42 which is suitably journaled on support means 10 immediately above pulley 16, the width of the groove in roller 42 is substantially the same as that of the tube 37, which is shown in FIG. 3 and permits the guiding of the tube 37 downwardly into position on the moving tape 25. Mounted on the support means 10 are a pair of brackets 45 and 46 which suitably support folding means such as turn-up rolls 47 and 48, which rolls 47 and 48 are in staggered relationship to facilitate the turning up of the respective side edges of the tape 25 as more clearly shown in FIGS. 4 and 5. The side edge *a* of tape 25 is turned over in advance of the side edge *b* to facilitate the encasement of the tube 37 by the tape 25. Mounted on the intermediate portion of horizontal support 14 is a bracket 50 which journals for rotation a roller 51. Roller 51 is in rolling engagement with the upper portion of the tape 25. Suitably journaled on the same axle that supports roller 51 is a bracket 52 whose outboard end supports for rotation a roller 53, which roller 53 has a reduced end portion 54 and an enlarged portion 55. The diameter of the reduced portion 54 is such that it maintains a firm contact with the side edge of the tape 25 *b* as seen more clearly in FIG. 6. A chain 58 interconnects the axle which supports roller 53 and the axle which supports roller 51 such that the rotation of 51 drives chain 58 and the roller 53. Since th diameter of roller 53 is less than that of roller 51, the peripheral speed of roller 53 is substantially greater than that of roller 51 which thereby performs a thorough pressing action on the tape 25. Roller 51 and 53 together perform the stitching operation. A second pressing roller 59 is located adjacent to roller 53, suitably journaled on a pair of brackets 60 and 61.

Encased tube 37 along with the fabric reinforced tape 25 form the wiper core of the wiper blade. Mounted on support means 10 are a pair of brackets 62 and 63 which support for rotation idler rollers 64 and 65 whose function is to turn over the core body, or the encased tube 37 along with tape 25, to present upwardly the tape 25 without a spliced section for a purpose to be described.

Mounted on one side edge of support means 10 is a grooved roller 70 which is operative to guide bead 71 from a suitable supply source to an idler roller 72 whose axis extends in a vertical direction such that the bead 71 is trained around such pulley 72. Brackets 73 and 74 mounted adjacent to idler roller 72 support for rotation a pair of vertically disposed rollers 75 and 76 wherein roller 76 is grooved centrally therein as at 77 as shown in FIG. 8 to accommodate the passage of the bead 71, such that the rotation of roller 76 deposits the bead 71 onto the upper surface of tape 25. Roller 76 also performs the function of adhering such bead to the tape 25. An anvil 78 is mounted in alignment with the upper conveying run of endless belt 20 for cooperation with a pneumatically operated cutting means 79 to sever the wiper blade being fabricated in a manner to be described. Cutting means 79 consists of a cutting blade 80 that is suitably mounted on the rod end of a pneumatic cylinder 81, which cylinder 81 is mounted on a bracket 82. The upper conveying run of endless belt 20 is trained about an idler pulley 83 for movement down and around a lower idler pulley 84 and thence over an idler pulley 85 to bypass the anvil 78. A counting device 88 is mounted on support 14 such that is outer rolling element 89 is in contact with the conveying belt 20 to precisely measure the length of fabric passing thereunder and being operative to energize pneumatic cylinder 81 upon a predetermined length of belt passing thereunder for the cutting operation to provide a predetermined length of wiper blade.

In the operation of the fabricating apparatus, reel 35 supplies the tube 37 which passes through tank 39 which coats the exterior surface of the tube with cement, after which such tube 37 passes downwardly towards the receiving end of the endless belt 20. Simultaneously with such action reel 23 supplies the tape 25, which tape 25 is directed by guide means 32 to the receiving end of the endless belt 20. The cement covered tube 37 is deposited on the tape 25 and is pressed firmly thereto through the action of the roller 42. The tape 25 travels along with the conveying run of belt 20. Thereafter the respective side edges of the tape are folded over the tube 37 through the action of the turn-up rollers 47 and 48 such that the tube is encased within the tape. Pressing rollers 51, 53 and 59 stitch the tape to the tube. Thereafter rollers 64 and 65 turn the encased tube completely over in preparation for having the bead 71 centered and placed centrally thereon. The encased tube along with bead 71 forms a wiper blade of continuous length which is cut into predetermined lengths by the cutting means 79 as controlled by the counting device 88 which counting device can be pre-set to provide for any length of cut desired. The cut tube is then vulcanized in a manner well known in the art and then provided with a plurality of holes that lies closely adjacent to the bead 71 communicating the central passageway in tube 37 with the exterior thereof.

I claim:

1. An apparatus for making wiper blades comprising support means; conveyor means mounted on said support means for providing a longitudinal moving support with a longitudinal center line; said conveyor means having a receiving end and a discharge end; first supply means for supplying in a continuous length an elongated fabric reinforced tape for movement onto said receiving end of said conveyor means for movement therewith; second supply means mounted adjacent to said receiving end of said conveyor means for supplying in a continuous length an elongated flat tube for positioning onto said moving tape at said receiving end of said conveyor means with the longitudinal center line of said tube being in alignment with said center line of said fabric tape and said center line of said conveyor means; turn-up means on said support means for folding the respective side edges of said fabric tape over said tube in overlapping relationship to encase said tube; pressing means mounted on said support means for pressing said continuously moving tube and tape into firm adhesion to each other to form a wiper core; feed means for feeding a bead onto the center line of said wiper core to form a continuous wiper blade; and cutter means mounted on said support means for cutting said wiper blade into predetermined lengths.

2. An apparatus for making wiper blades as set forth in claim 1 wherein said pressing means has a pair of rollers located in tandem; one of said rollers being located closer to said turn-up means than the other of said rollers; means connected to said other roller for driving said other roller at a faster speed than said one roller to provide a firm adhesion of the overlapping tape to said tube.

3. An apparatus for making wiper blades as set forth in claim 2 wherein a cementing means is located between said second supply means and said receiving end of said conveyor means operative to coat the exterior surface of said tube prior to placement on said fabric tape.

4. An apparatus for making a wiper blade comprising support means, conveyor means having an upper conveying run and a lower return run; supply means for supplying a continuous length of tube and a continuous length of fabric reinforced elastomeric material simultaneously to said conveyor means; guide means mounted on said support means and cooperative with said conveyor means for aligning said tube centrally with the longitudinal center line of said upper conveying run and onto said fabric reinforced material moving on said upper conveying conveyor means; folding means mounted on said support means for folding the respective side edges of said moving fabric reinforced material in overlapping relationship to encase said tube and said fabric reinforced material to form a core body; pressing means mounted on said support means for adhering said tube and fabric reinforced material; means for positioning a wiper bead centrally on the moving core body of tube encased fabric material to form an uncured continuous length wiper blade; and cutting means for severing said continuous length of moving wiper blade into wiper blades of predetermined length.

5. An apparatus for making wiper blades as set forth in claim 4 wherein means for measuring the movement of said conveyor means is operative to energize said cutting means to sever said continuously moving wiper blade into predetermined lengths.

6. An apparatus for making wiper blades as set forth in claim 5 wherein means for turning the core body of the tube and fabric reinforced elastomeric material upside down is located between said stitching means and said means for positioning a wiper bead on said support means.

7. An apparatus for making wiper blades as set forth in claim 6 where said pressing means includes a pair of rollers in rolling engagement with said core body, one of said rollers being disposed closer to said folding means than the other of said rollers, and drive means connected to one roller for rotating said one roller at a faster speed than the other of said rollers.

8. An apparatus for making wiper blades as set forth in claim 7 wherein said support means including a supply reel mounted thereon for storing tube therein, a cementer mounted on said support means adjacent to said supply reel for applying cement to said tube as it passes therefrom to said conveyor means.

References Cited

UNITED STATES PATENTS

| | | | |
|---|---|---|---|
| 1,545,815 | 7/1925 | Dirkson et al. | 156—403 |
| 1,686,466 | 10/1928 | Putt | 156—460 |
| 2,696,865 | 12/1954 | Oeiler | 161—107 X |
| 2,732,882 | 1/1956 | Kuts | 156—467 X |

FOREIGN PATENTS

| | | | |
|---|---|---|---|
| 206,670 | 11/1923 | Great Britain | 156—467 |

ALFRED L. LEAVITT, Primary Examiner

D. A. SIMMONS, Assistant Examiner

U.S. Cl. X.R.

156—201, 216, 461, 463, 465